United States Patent [19]

Shiraki et al.

[11] Patent Number: 4,507,458
[45] Date of Patent: Mar. 26, 1985

[54] URETHANE ACRYLATE COMPOSITIONS

[75] Inventors: Hiroyuki Shiraki, Kobe; Tetsuro Abe, Suita, both of Japan

[73] Assignee: Takeda Chemical Industries, Ltd., Osaka, Japan

[21] Appl. No.: 594,480

[22] Filed: Mar. 27, 1984

[30] Foreign Application Priority Data

Apr. 14, 1983 [JP] Japan .................................. 58-66627
Feb. 9, 1984 [JP] Japan .................................. 59-23937

[51] Int. Cl.$^3$ ............................................. C08G 18/32
[52] U.S. Cl. ...................................... 528/49; 427/127; 427/128; 428/423.1; 428/900
[58] Field of Search ................... 528/49; 427/127, 128; 428/423.1, 900

[56] References Cited

U.S. PATENT DOCUMENTS 4,112,017  9/1978  Howard .
4,246,379  1/1981  Howard .
4,334,034  6/1982  Lehner et al. .
4,366,301 12/1982  Le Roy et al. .

FOREIGN PATENT DOCUMENTS 72918  3/1983  Fed. Rep. of Germany .

Primary Examiner—Maurice J. Welsh
Attorney, Agent, or Firm—Wenderoth, Lind & Ponack

[57] ABSTRACT

A urethane acrylate resin obtained by reacting a polyisocyanate with a polyester polyol having a molecular weight of 500 to 3,000, a low-molecular-weight polyol having a molecular weight of 60 to 400 and a hydroxyalkyl acrylate containing at least 70 mole % of a monohydroxyalkyl acrylate at an NCO/OH equivalent ratio in the range of 0.7 to 1.20.

The composition comprising the above urethane acrylate resin affords crosslinked products having extremely excellent, tough physical properties, and can therefore be advantageously employed, for example, for base coatings for paper and polyethylene films prior to vacuum metallizing, protective coatings after vacuum metallizing, covering materials for electromagnetic tapes and floppy discs, vehicles for printing ink, adhesives, etc.

10 Claims, No Drawings

URETHANE ACRYLATE COMPOSITIONS

The present invention relates to urethane acrylate resins which excel both in elongation at break and tensile strength and to coatings and/or binders containing the same.

In recent years, an increasing number of radiation-crosslinkable resin compositions have been developed, and such resin compositions have begun to find application in such areas as paints, adhesives, tackifiers and binders for electromagnetic tapes. And their application fields are expected to expand increasingly in the future. Among these, there were reported radiation-crosslinkable urethane-acrylates in U.S. Pat. Nos. 4,112,017, 4,334,034, 4,366,301 and EP No. 0 072 918 A1, but these compositions both provide only hard and brittle crosslinked products, but have not produced any tough crosslinked product so far. At present, there has not yet been developed the radiation-crosslinkable urethane-acrylate which exhibits in combination elongation at break of not less than 100% and tensile strength of not less than 300 kg/cm$^2$.

Under these circumstances, the present inventors conducted intensive research, and as a result, found that when a polyester polyol having a molecular weight of 500 to 3,000 and a low-molecular-weight polyol having a molecular weight of 60 to 400 are used in combination together with a hydroxyalkyl acrylate containing at least 70 mole % of a monohydroxyalkyl acrylate as an OH component, and the admixture is reacted with a polyisocyanate at an NCO/OH equivalent ratio in the range of 0.7 to 1.20, the resulting urethane acrylate resins can provide tough crosslinked products having elastomer-like properties. It was also found that magnetic recording media which contain such urethane acrylate resins, with their satisfactory fluidities, used as a binder have improved coating film characteristics, and as a result show excellent heat resistance, and these findings have culminated in the present invention.

Thus, the principal object of the present invention is to provide urethane acrylate resins obtained by reacting a polyisocyanate with a polyester polyol having a molecular weight of 500 to 3,000, a polyol having a molecular weight of 60 to 400 and a hydroxyalkyl acrylate containing at least 70 mole % of a monohydroxyalkyl acrylate at an NCO/OH equivalent ratio in the range of 0.7 to 1.20.

Another object of the present invention is to provide coating and/or bonding compositions comprising the above urethane acrylate resins.

Still another object of the present invention is to provide a magnetic layer comprising the above urethane acrylate resins as a binder.

The polyisocyanate which is useful in the present invention may be any type of aromatic, aliphatic, alicyclic and aromatic-aliphatic polyisocyanates, and among them, aliphatic and alicyclic polyisocyanates are preferable. Suitable examples of such polyisocyanates include tetramethylene diisocyanate, hexamethylene diisocyanate, ω,ω'-diisocyanatodimethylcyclohexane, dicyclohexylmethane diisocyanate, isophorone diisocyanate, ω,ω'-diisocyanatodimethylbenzene, methylcyclohexylene diisocyanate, lysine diisocyanate, tolylene diisocyanate, diphenylmethane diisocyanate, etc.; or polyisocyanates obtained by reacting excess of these polyisocyanates with low-molecular-weight active hydrogen compounds such as ethylene glycol, propylene glycol, dipropylene glycol, butylene glycol, trimethylol propane, hexanetriol, glycerol, sorbitol, pentaerythrytol, castor oil, ethylenediamine, hexamethylenediamine, ethanolamine, diethanolamine, triethanolamine, water, ammonia and urea, or high-molecular-weight active hydrogen compounds such as various polyether polyols, polyester polyols and acrylic polyols, or biuret compounds and allophanate compounds thereof, and the like.

As the polyester polyol which is usable in the present invention, useful and valuable are polyester diols having a molecular weight in the range of about 500 to 3,000, preferably about 800 to 2,300, to be obtained by the polycondensation of polybasic acids, such as adipic acid, succinic acid, azelaic acid, sebacic acid, phthalic acid, isophthalic acid and terephthalic acid, with polyhydric alcohols, such as 1,4-butanediol, 1,3-butanediol, ethylene glycol, diethylene glycol, propylene glycol, 1,2-propylene glycol, dipropylene glycol, 1,6-hexaneglycol and neopentyl glycol.

Examples of the polyol having a molecular weight of 60 to 400 which is usable in the present invention include ethylene glycol, diethylene glycol, propylene glycol, dipropylene glycol, 1,4-butanediol, 1,3-butanediol, 1,4-cyclohexanediol, 1,4-cyclohexanedimethanol, glycerol, trimethylolpropane and 3-methyl-1,3,5-pentanetriol.

The hydroxyalkyl acrylate which is usable in the present invention is one containing at least 70 mole % of a monohydroxyalkyl acrylate such as 2-hydroxy-ethyl methacrylate, 2-hydroxypropyl methacrylate, 2-hydroxyethyl acrylate, 2-hydroxypropyl acrylate and 2-hydroxypentyl acrylate etc., and an ingredient other than the monohydroxyalkyl acrylate includes a dihydroxyalkyl acrylate represented by the following formula:

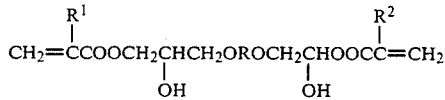

(wherein R$^1$ and R$^2$ each are hydrogen or a methyl group; R is an alkylene group, etc.), such as ethylene glycol diglycidyl ether methacrylic acid adducts (Epoxy Ester 40EM, produced by Kyoeisha Oils & Fats Industry Co. in Japan), propylene glycol diglycidyl ether acrylic acid adducts (Epoxy Ester 70PA) and glycerol diglycidyl ether acrylic acid adducts (Epoxy Ester 80MFA).

The urethane acrylate resins of the present invention can be obtained by the reaction among the abovementioned polyisocyanate, polyester polyol, low-molecular-weight polyol and hydroxyalkyl acrylate containing at least 70 mole % of monohydroxyalkyl acrylate at an NCO/OH equivalent ratio of about 0.7 to 1.20, preferably about 0.8 to 1.05.

Not more than 70 mole % of the monohydroxyalkyl acrylate content leads hard and brittle crosslinked products. Even when the monohydroxyalkyl acrylte content is not more than 70 mole %, still, improved elongation can be imparted to the urethane acrylate resin by increasing its own molecular weight as well as the molecular weight of chain segments both ends of which are crosslinked. Nevertheless, this cannot produce crosslinked products having not less than 100% of elongation at break and not less than 300 kg/cm$^2$ of tensile strength in combination. In addition, because of high molecular weight of the urethane acrylate resin, the viscosity grows and the solubility in solvents deteriorates, resulting in difficulties encountered in handling it.

The urethane acrylate resins of the present invention can be produced not only by the one-step reaction among the above-mentioned polyisocyanate, polyester polyol, low-molecular-weight polyol and hydroxyalkyl acrylate at the ratio as described above, but also by the method which comprises reacting a mixture of the polyester and low-molecular-weight polyol in advance with the polyisocyanate at the above-mentioned ratio (the ratios in which the NCO group is in excess are particularly preferable), followed by adding the hydroxyalkyl acrylate to the resultant system to allow to react.

The addition proportions for the respective polyester polyol, low-molecular-weight polyol and hydroxyalkyl acrylate are as follows:

On the basis of an equivalent of the polyester polyol, the polyol having a molecular weight of 60 to 400 is about 0.02 to 50 equivalents and the hydroxyalkyl acrylate is about 0.05 to 60 equivalents; preferably, on the basis of an equivalent of the polyester polyol, the polyol having a molecular weight of 60 to 400 is about 0.1 to 10 equivalents and the hydroxyalkyl acrylate is about 0.2 to 12 equivalents.

In carrying out the above-mentioned reaction, use can be made of the known catalysts for urethane reaction such as stannous octoate, dibutyltin dilaurate and tertiary amines, if necessary.

The above-mentioned reaction can also be conducted in an aromatic solvent such as toluene, xylene and benzene, ketone solvent such as acetone, methyl ethyl ketone, methyl isobutyl ketone and cyclohexanone, halogenated hydrocarbon such as dichloromethane and 1,1,1-trichloroethane, acetate solvent such as ethyl acetate, propyl acetate, isopropyl acetate and butyl acetate, and other inert solvent such as N,N-dimethylformamide, N,N-dimethylacetamide, tetrahydrofuran and di-n-butyl ether. The above-mentioned solvents are employed in such amounts as the solid content may be about 20 to 80 weight %.

In order to prevent the radical polymerization in the resultant urethane-acrylate, also, radical-polymerization inhibitors in the range of about 0.001 to 0.05 weight % may be added to the system. As examples of such inhibitors, there may be mentioned phenols having steric hindrance such as hydroquinone, hydroquinone monomethyl ether, 2,6-di-t-butyl-p-cresol and others.

Crosslinked products of the urethane-acrylate resins obtained by the above procedure exhibit, in combination, elongation at break of not less than 100% and tensile strength of not less than 300 kg/cm$^2$, and have elastomerlike properties. Yet, such urethane-acrylate resins, when further incorporated with not more than 20 weight % of a compound with a molecular weight of less than 600 having not less than one radiation-crosslinkable, unsaturated double bond that is called the reactive diluent, can produce tough crosslinked products having varied 100% modulus values. As examples of such reactive diluent, there may be mentioned acrylic acid or methacrylic-acid adducts of various glycol diglycidyl ethers such as ethylene glycol diglycidyl ether, propylene glycol diglycidyl ether, glycerol diglycidyl ether, etc., or acrylates compounds such as 2-ethylhexyl acrylate, 2-ethylhexyl methacrylate, 1,6-hexanediol diacrylate, trimethylolpropane triacrylate etc.

The urethane-acrylate resins of the present invention as obtained by the above procedure can be used either solely or as a mixture with known solvents, pigments, ferrite, fillers, plasticizers, etc. which are normally added for example to coatings, ink or adhesives, etc. if necessary.

Especially when the urethane acrylate resin of the present invention is used as binder to produce magnetic recording media, its improved solubility in solvents permits the resulting coating material to be applied under reduced viscosity conditions, resulting in excellent dispersibility of magnetic powder. The coating material, with its satisfactory fluidity, provides magnetic layers having improved coating film characteristics, and as a result can yield magnetic recording media with excellent heat resistance.

The production of magnetic recording media may be carried out in accordance with conventional processes; for example, a magnetic coating composition containing magnetic powder, urethane acrylate resin as the binder, solvent and other additives may be deposited on substrate such as polyester film by arbitrary means such as spraying or roller application, followed by drying and crosslinking. The magnetic powder includes a variety of known magnetic powders such as $\gamma$-$Fe_2O_3$, $Fe_3O_4$, Co containing $Fe_2O_3$, Co containing $Fe_3O_4$, $CrO_2$, Fe, Ni, Co and other metals.

As the means of crosslinking the composition of the present invention, for example, there can be adopted electron-beam crosslinking, ultraviolet ray crosslinking, heat crosslinking and any of other known means.

In the case of crosslinking of the composition of the present invention using ultraviolet ray, the photopolymerization initiators to be described below are added. Specific examples of such initiators include benzophenone, p-methoxybenzophenone, acetophenone, sec-butoxyacetophenone, m-chloroacetophenone, propiophenone, $\alpha$-hydroxyisobutyrophenone, xanthone, benzoin, benzil, benzaldehyde, naphthoquinone, anthraquinone, etc., and with reference to their addition amount, they are added in the range of about 0.1 to 15 weight % against the urethane-acrylate contained in the composition, whereby photosensitizers such as methylamine, diethanolamine, N-methyldiethanolamine and tributylamine may furthermore be added.

In the event of crosslinking of the composition of the present invention by heat, use can be made of the compounds being known as radical polymerization initiator, such as hydrogen peroxide, ammonium persulfate, benzoyl peroxide, cumene peroxide, cyclohexane peroxide, di-t-butyl peroxide, t-butyl hydroperoxide, methyl ethyl ketone peroxide and azobisisobutyronitrile.

In the case of crosslinking by irradiation of electron beam, addition of additives such as photopolymerization initiators and radical polymerization initiators is not particularly required.

The compositions of the present invention, even by adopting any of these crosslinking methods, afford crosslinked products having extremely excellent, tough physical properties which have not been obtainable in the past, and can therefore be advantageously employed, for example, for base coatings for paper and polyethylene films prior to vacuum metallizing, protective coatings after vacuum metallizing, covering materials for electromagnetic tapes and floppy discs, vehicles for printing ink, adhesives, etc.

In cases in which the composition of the present invention is utilized in the above-mentioned application fields, it is applied to a film thickness in the range of about 0.1 to 100μ.

Examples are described below to illustrate the present invention more specifically.

EXAMPLE 1

The inside of a 3-l four neck flask equipped with a stirrer, thermometer and reflux condenser was filled with nitrogen gas, and charged into the flask were 1200 g of toluene, 954 g of poly butylene adipate having a hydroxyl value of 58.8, 22.5 g of 1,4-butanediol and 240 mg of stannous octoate as catalyst. Said mixture was heated at 65° C., and 221 g of isophorone diisocyanate was added, followed by stirring at 80° C. until the amine equivalent remained constant (about 2400). Subsequently, 72.5 g of 2-hydroxyethyl methacrylate and 120 mg of hydroquinone monomethyl ether as stabilizer were added, and the mixture was stirred at 70° C. until not less than 98% of the isocyanate group was reacted to make the urethaneacrylate resin (A) of the present invention.

EXAMPLE 2

By following the same procedure as in Example 1 except that a mixture of 11.3 g of 1,4-butanediol and 11.2 g of trimethylolpropane was used in place of 22.5 g of 1,4-butanediol in Example 1, the urethane-acrylate resin (B) of the present invention was synthesized.

EXAMPLE 3

By following the same procedure as in Example 1 except that 33.6 g of 3-methyl-1,3,5-pentanetriol was used in place of 22.5 g of 1,4-butanediol in Example 1, the urethane-acrylate resin (C) of the present invention was synthesized.

EXAMPLE 4

By following the same procedure as in Example 1 except that 33.5 g of dipropylene glycol and 188 g of ω,ω'-diisocyanate dimethylbenzene were employed in place of 22.5 g of 1,4-butanediol and 221 g of isophorone diisocyanate in Example 1, respectively, the urethaneacrylate resin (D) of the present invention was synthesized.

EXAMPLE 5

By following the same procedure as in Example 1 except that 33.5 g of dipropylene glycol and 262 g of dicyclohexylmethane diisocyanate were used in place of 22.5 g of 1,4-butanediol and 221 g of isophorone diisocyanate in Example 1, respectively, the urethaneacrylate resin (E) of the present invention was synthesized.

EXAMPLE 6

By following the same procedure as in Example 1 except that 33.5 g of dipropylene glycol and 240 g of hexamethylene diisocyanate were utilized in place of 22.5 g of 1,4-butanediol and 221 g of isophorone diisocyanate in Example 1, respectively, the urethaneacrylate resin (F) of the present invention was synthesized.

EXAMPLE 7

By following the same procedure as in Example 1 except that 59.3 g of 2-hydroxyethyl acrylate was used in place of 72.5 g of 2-hydroxyethyl methacrylate in Example 1, the urethane-acrylate resin (G) of the present invention was synthesized.

EXAMPLE 8

The inside of a 3-l four-neck flask equipped with a stirrer, thermometer and reflux condenser was filled with nitrogen gas, and 1166 g of toluene, 767 g of polybutylene adipate having a molecular weight of 1022, 67 g of 3-methyl-1,3,5-pentanetriol and 233 mg of stannous octoate as a catalyst were charged into it. The said mixture was heated at 65° C., and 332 g of isophorone diisocyanate was added, followed by stirring at 80° C. until the amine equivalent of the resultant mixture reached about 2400. Then, 71.0 g of 2-hydroxyethyl methacrylate and 120 mg of hydroquinone monomethyl ether as a stabilizer were added, and stirring was continued until not less than 98% of the isocyanate groups were reacted to prepare the urethane-acrylate resin (H) of the present invention.

EXAMPLE 9

By following the same procedure as in Example 1 except that a mixture of 17.5 g of 1,4-butanediol and 19.3 g of ethylene glycol diglycidyl ether-methacrylic acid adduct (Epoxy Ester 40EM, produced by Kyoeisha Oils & Fats Industries Co. in Japan) was used in place of 22.5 g of 1,4-butanediol, the urethane-acrylate resin (I) of the present invention was synthesized.

EXAMPLE 10

The inside of a 3-l four neck flask equipped with a stirrer, thermometer and reflux condenser was filled with nitrogen gas, and 1235 g of toluene, 954 g of poly butylene adipate having a hydroxyl value of 58.8, 33.5 g of dipropylene glycol, 65 g of 2-hydroxyethyl methacrylate, 250 g of diphenylmethane diisocyanate and 120 mg of hydroquinone monomethyl ether as stabilizer were added, followed by stirring at 70° C. until the amine equivalent remained constant (about 12,000) to make the urethaneacrylate resin (J) of the present invention.

EXAMPLES 11 THROUGH 29

The compositions of the urethane-acrylate resins (A) through (I) as obtained in the above Examples 1 through 9 incorporated with a reactive diluent were coated on polyester films by use of a 6-mil doctor blade, and crosslinked by irradiation of ultraviolet ray or electron beam, followed by measurement of 100% modulus, tensile strength and elongation at break of the resultant crosslinked products.

In the case of crosslinking with ultraviolet ray (UV), crosslinking was performed by employing Darocure 1173 ® (produced by Merck & Co., Inc. of U.S.A.) as photopolymerization initiator and diethanolamine as photosensitizer and by irradiating in the width of 10 cm from the height of 12 cm with a ultraviolet ray lamp of 2 KW for 3 to 6 seconds.

In the case of crosslinking with electron beam (EB), crosslinking was effected at the radiation dose of 2 Mrad.

Shown in Table 1 are the formulations for these compositions as well as 100% modulus, tensile strength and elongation at break of the crosslinked products.

EXAMPLE 30

The composition of 100 g of the urethane-acrylate resin (J) as obtained in the above Example 10 being incorporated with 2.5 g of 1,6-hexanediol diacrylate and 1.0 g of benzoyl peroxide was coated on a polyester film by the use of a 6-mil doctor blade, and baked in an oven thermostated at 140° C. for 1 hour. 100% modulus, tensile strength and elongation at break of the said crosslinked product were measured. The results are shown in Table 1.

TABLE 1

|  | 11 | 12 | 13 | 14 | 15 | 16 | 17 | 18 | 19 | 20 |
|---|---|---|---|---|---|---|---|---|---|---|
| Urethane-acrylate resin (100 g) | (A) | (A) | (A) | (B) | (C) | (C) | (C) | (C) | (C) | (D) |
| 1,6 HX-A (g) | 2.5 | 5.0 | — | — | 2.5 | — | 2.5 | 5.0 | — | 2.5 |
| TMP-TA (g) | — | — | 2.5 | — | — | — | — | — | 2.5 | — |
| Darocure 1173 (g) | 1.0 | 1.0 | 1.0 | 1.0 | 1.0 | — | — | — | — | 1.0 |
| Diethanol amine (g) | 1.0 | 1.0 | 1.0 | 1.0 | 1.0 | — | — | — | — | 1.0 |
| Curing means | UV | UV | UV | UV | UV | EB | EB | EB | EB | UV |
| 100% Mo (kg/cm$^2$) | 16.4 | 28.4 | 23.2 | 362.5 | 481.4 | 29.3 | 33.3 | 183.7 | 101.4 | 21.2 |
| Tensile strength (kg/cm$^2$) | 580 | 430 | 415 | 520 | 590 | 332 | 338 | 315 | 370 | 322 |
| Elongation at break (%) | 380 | 250 | 280 | 160 | 120 | 250 | 235 | 145 | 200 | 380 |

|  | 21 | 22 | 23 | 24 | 25 | 26 | 27 | 28 | 29 | 30 |
|---|---|---|---|---|---|---|---|---|---|---|
| Urethane-acrylate resin (100 g) | (E) | (F) | (G) | (G) | (G) | (H) | (H) | (H) | (I) | (J) |
| 1,6 HX-A (g) | 2.5 | 2.5 | 2.5 | — | 5.0 | — | 2.5 | — | — | 2.5 |
| TMP-TA (g) | — | — | — | — | — | — | — | 5.0 | — | — |
| Darocure 1173 (g) | 1.0 | 1.0 | — | — | — | — | — | — | — | — |
| Diethanol amine (g) | 1.0 | 1.0 | — | — | — | — | — | — | — | — |
| Curing means | UV | UV | EB | EB | EB | EB | EB | EB | EB | Heat |
| 100% Mo (kg/cm$^2$) | 15.8 | 11.2 | 45.2 | 26.8 | 189.7 | 38.5 | 112.0 | 270.4 | 63.5 | 45.2 |
| Tensile strength (kg/cm$^2$) | 385 | 310 | 425 | 393 | 341 | 362 | 319 | 315 | 308 | 425 |
| Elongation at break (%) | 360 | 450 | 175 | 250 | 120 | 220 | 150 | 120 | 140 | 175 |

1,6 HX A: 1,6-hexanediol diacrylate
TMP-TA: trimethylolpropane triacrylate

EXAMPLE 31

| | |
|---|---|
| γ-Fe$_2$O$_3$ | 100 parts by weight |
| Urethane acrylate resin (G) | 20 parts by weight |
| 1,6HX-A | 0.5 part by weight |
| Vinyl chloride-vinyl acetate-vinyl alcohol copolymer (VAGH; produced by UCC) | 10 parts by weight |
| Lecitin | 1 part by weight |
| Methyl ethyl ketone | 150 parts by weight |
| Toluene | 150 parts by weight |

A magnetic coating composition was prepared in accordance with the above-described formulation, and applied on a 16μ thick base film made of polyethylene terephthalate, followed by drying and conducting calendering treatment. The coated film was irradiated with electron beams of 4 Mrad at the acceleration voltage of 175 KV and cut to the given width to make magnetic tape. The resultant magnetic tape exhibited a squareness ratio of Br/Bs=0.81 and a maximum magnetic flux density of Bs=1850 G, and when the tape was wound on a glass tube under 1 kg/cm$^2$ of tension applied, allowed to stand at 45° C. and 80% of RH for 24 hours and then at ordinary temperature for 24 hours and unwound from it, there was observed no tackiness. As may be obvious from the above, the magnetic coating prepared from the urethane acrylates of the present invention being employed as a binder component showed excellent dispersibility of magnetic powders and as a result, permitted the production of magnetic recording media exhibiting enhanced squareness ratio and maximum magnetic flux density as well as excellent heat resistance.

What is claimed is:

1. A urethane acrylate resin obtained by reacting a polyisocyanate with a polyester polyol having a molecular weight of 500 to 3,000, a low-molecular-weight polyol having a molecular weight of 60 to 400 and a hydroxyalkyl acrylate containing at least 70 mole % of a monohydroxyalkyl acrylate at an NCO/OH equivalent ratio in the range of 0.7 to 1.20.

2. A urethane acrylate resin claimed in claim 1, wherein the polyester polyol is a polyester diol having a molecular weight of 800 to 2,300.

3. A urethane acrylate resin claimed in claim 1, wherein the equivalent ratio of the low-molecular-weight polyol relative to the polyester polyol is 0.1 to 10.

4. A urethane acrylate resin claimed in claim 1, wherein the equivalent ratio of the hydroxyalkyl acrylate relative to the polyester polyol is 0.2 to 12.

5. A urethane acrylate resin claimed in claim 1, wherein the NCO/OH equivalent ratio is in the range of 0.8 to 1.05.

6. A urethane acrylate resin claimed in claim 1, wherein the polyester polyol is one obtained by the polycondensation of adipic acid with 1,4-butanediol.

7. A urethane acrylate resin claimed in claim 1, wherein the polyisocyanate is isophorone diisocyanate, ω,107 '-diisocyanatodimethylbenzene, dicyclohexylmethane diisocyanate, diphenylmethane diisocyanate or hexamethylene diisocyanate.

8. A urethane acrylate resin claimed in claim 1, wherein the low-molecular-weight polyol is 1,4-butanediol, trimethylolpropane, 3-methyl-1,3,5-pentanetriol or dipropylene glycol.

9. A composition for coating and/or bonding, which comprises a urethane acrylate resin obtained by reacting a polyisocyanate with a polyester polyol having a molecular weight of 500 to 3,000, a low-molecular-weight polyol having a molecular weight of 60 to 400 and a hydroxyalkyl acrylate containing at least 70 mole % of a monohydroxyalkyl acrylate at an NCO/OH equivalent ratio in the range of 0.7 to 1.20.

10. A magnetic recording medium having a magnetic layer which comprises as a binder a urethane acrylate resin obtained by reacting a polyisocyanate with a polyester polyol having a molecular weight of 500 to 3,000, a low-molecular-weight polyol having a molecular weight of 60 to 400 and a hydroxyalkyl acrylate containing at least 70 mole % of a monohydroxyalkyl acrylate at an NCO/OH equivalent ratio in the range of 0.7 to 1.20.

* * * * *